(12) United States Patent
Myers et al.

(10) Patent No.: US 9,880,854 B1
(45) Date of Patent: Jan. 30, 2018

(54) REBOOT SYSTEM AND METHOD

(71) Applicant: EMC CORPORATION, Hopkinton, MA (US)

(72) Inventors: Jackson B. Myers, Cary, NC (US); Phillip H. Leef, Boston, MA (US); Michael L. Burriss, Raleigh, NC (US); Brion P. Philbin, North Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 14/871,740

(22) Filed: Sep. 30, 2015

(51) Int. Cl.
  *G06F 9/44* (2006.01)
  *G06F 9/445* (2006.01)
(52) U.S. Cl.
  CPC .............. *G06F 9/4401* (2013.01); *G06F 8/61* (2013.01); *G06F 8/65* (2013.01); *G06F 9/4406* (2013.01)
(58) Field of Classification Search
  CPC ............. G06F 9/4401; G06F 8/61; G06F 8/65
  See application file for complete search history.

(56) References Cited

U.S. PATENT DOCUMENTS

| 6,965,953 | B2 * | 11/2005 | Kujirai | G06F 8/61 710/10 |
| 7,734,904 | B2 * | 6/2010 | Piwonka | G06F 9/4411 709/220 |
| 8,171,276 | B2 * | 5/2012 | Fried | G06F 8/61 713/2 |
| 2008/0263347 | A1 * | 10/2008 | Chen | G06F 9/4416 713/2 |

* cited by examiner

*Primary Examiner* — Stefan Stoynov
(74) *Attorney, Agent, or Firm* — Brian J. Colandreo; Mark H. Whittenberger; Holland & Knight LLP

(57) ABSTRACT

A method, computer program product, and computing system for initiating a computing device includes setting a master reboot flag to no reboot required. A first software component in an initiation component stack is executed. Upon completing execution of the first software component, a determination is made concerning whether the computing device requires: an immediate reboot, a deferred reboot, or no reboot.

20 Claims, 3 Drawing Sheets

REBOOT SYSTEM AND METHOD

TECHNICAL FIELD

This disclosure relates to storage systems and, more particularly, to systems and methods for rebooting storage systems.

BACKGROUND

Storing and safeguarding electronic content is of paramount importance in modern business. Accordingly, various methodologies may be employed to protect such electronic content. One such methodology is to utilize various data systems and arrays that allow for a high level of access and availability to such electronic content. Unfortunately, such data systems and arrays may need to be rebooted to accommodate e.g., software upgrades, hardware upgrades and/or firmware upgrades, often resulting in considerable downtime.

SUMMARY OF DISCLOSURE

In one implementation, a computer-implemented method for initiating a computing device includes setting a master reboot flag to no reboot required. A first software component in an initiation component stack is executed. Upon completing execution of the first software component, a determination is made concerning whether the computing device requires: an immediate reboot, a deferred reboot, or no reboot.

One or more of the following features may be included. If the computing device requires an immediate reboot: the computing device may be rebooted, the master reboot flag may be set to no reboot required, and a software component in the initiation component stack may be executed. If the computing device requires a deferred reboot: the master reboot flag may be set to reboot required, and a next software component in the initiation component stack may be executed. If the computing device requires no reboot, a next software component in the initiation component stack may be executed. One or more additional software components in the initiation component stack may be executed and, upon completing execution of each of the one or more additional software components, a determination is made concerning whether the computing device requires: an immediate reboot, a deferred reboot, or no reboot. If the master reboot flag is set to reboot required, the master reboot flag may be set to no reboot required and the computing device may be rebooted upon completing execution of a last software component in the initiation component stack. The computing device may be initiated due to one or more of: a firmware installation; an initial configuration/upgrade; a firmware upgrade; a software upgrade; and a hardware upgrade.

In another implementation, a computer program product resides on a computer readable medium and has a plurality of instructions stored on it. When executed by a processor, the instructions cause the processor to perform operations including setting a master reboot flag to no reboot required. A first software component in an initiation component stack is executed. Upon completing execution of the first software component, a determination is made concerning whether the computing device requires: an immediate reboot, a deferred reboot, or no reboot.

One or more of the following features may be included. If the computing device requires an immediate reboot: the computing device may be rebooted, the master reboot flag may be set to no reboot required, and a software component in the initiation component stack may be executed. If the computing device requires a deferred reboot: the master reboot flag may be set to reboot required, and a next software component in the initiation component stack may be executed. If the computing device requires no reboot, a next software component in the initiation component stack may be executed. One or more additional software components in the initiation component stack may be executed and, upon completing execution of each of the one or more additional software components, a determination is made concerning whether the computing device requires: an immediate reboot, a deferred reboot, or no reboot. If the master reboot flag is set to reboot required, the master reboot flag may be set to no reboot required and the computing device may be rebooted upon completing execution of a last software component in the initiation component stack. The computing device may be initiated due to one or more of: a firmware installation; an initial configuration/upgrade; a firmware upgrade; a software upgrade; and a hardware upgrade.

In another implementation, a computing system including a processor and memory is configured to perform operations including setting a master reboot flag to no reboot required. A first software component in an initiation component stack is executed. Upon completing execution of the first software component, a determination is made concerning whether the computing device requires: an immediate reboot, a deferred reboot, or no reboot.

One or more of the following features may be included. If the computing device requires an immediate reboot: the computing device may be rebooted, the master reboot flag may be set to no reboot required, and a software component in the initiation component stack may be executed. If the computing device requires a deferred reboot: the master reboot flag may be set to reboot required, and a next software component in the initiation component stack may be executed. If the computing device requires no reboot, a next software component in the initiation component stack may be executed. One or more additional software components in the initiation component stack may be executed and, upon completing execution of each of the one or more additional software components, a determination is made concerning whether the computing device requires: an immediate reboot, a deferred reboot, or no reboot. If the master reboot flag is set to reboot required, the master reboot flag may be set to no reboot required and the computing device may be rebooted upon completing execution of a last software component in the initiation component stack. The computing device may be initiated due to one or more of: a firmware installation; an initial configuration/upgrade; a firmware upgrade; a software upgrade; and a hardware upgrade.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
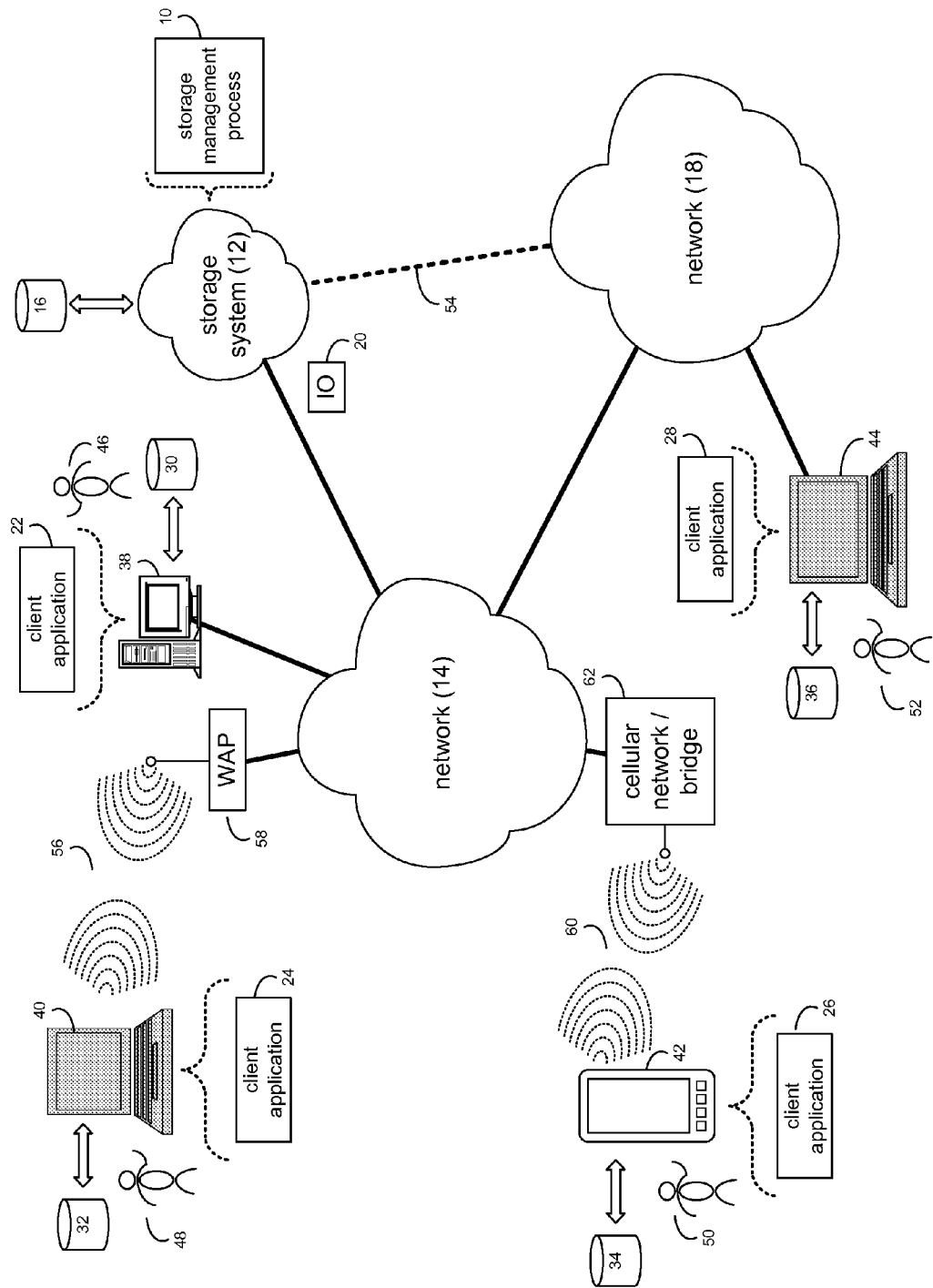
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
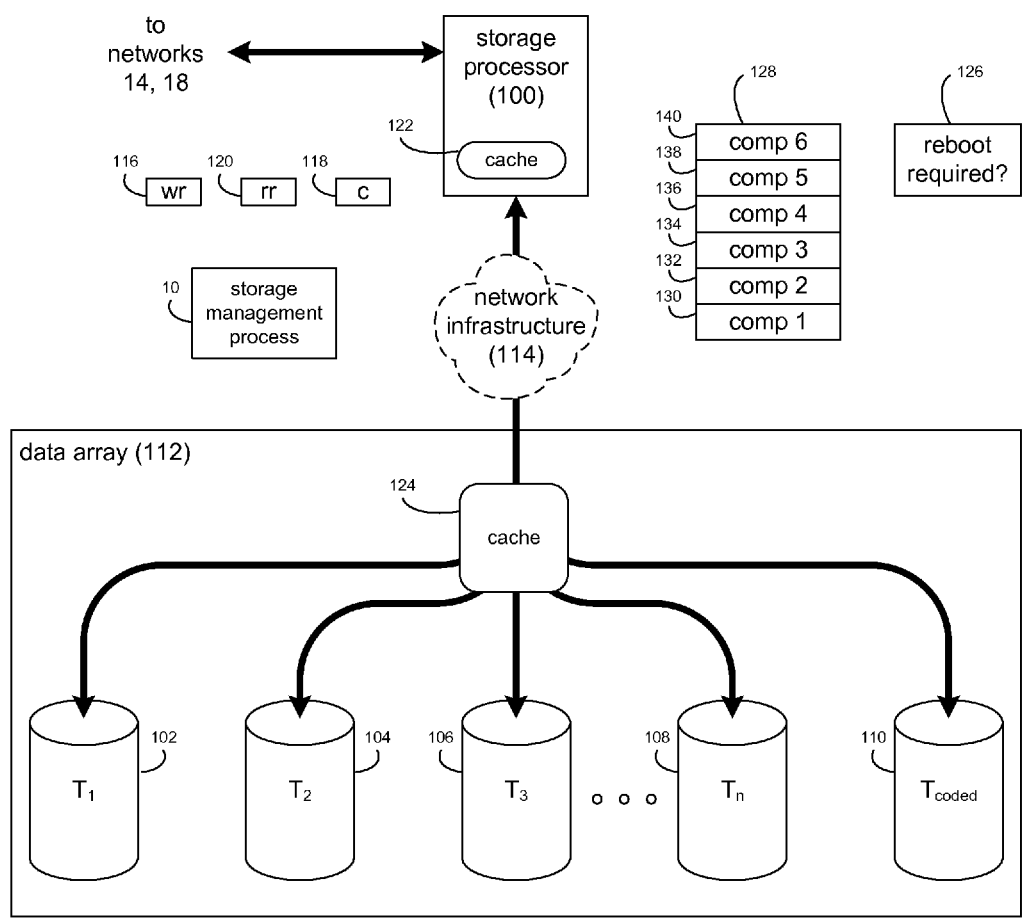
FIG. 2 is a diagrammatic view of the storage system of FIG. 1.

Referring also to FIG. 2, storage system 12 may include storage processor 100 and a plurality of storage targets T 1-n (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

During operation of storage processor 100, content 118 to be written to storage system 12 may be received by storage processor 100. Additionally/alternatively and when storage processor 100 is configured as an application server, content 118 to be written to storage system 12 may be internally generated by storage processor 100.

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

The Storage Management Process:

Oftentimes a computing device (such as storage processor 100) will need to be modified/upgraded. Examples of such modifications/upgrades may include but are not limited to firmware upgrades (e.g., modifying/upgrading the BIOS in one or more hardware components of storage processor 100), software upgrades (e.g., modifying/upgrading one or more software applications executed on storage processor 100); and hardware upgrades (e.g., installing/removing one or more hardware components included within storage processor 100).

Unfortunately, when such firmware upgrades, software upgrades and/or hardware upgrades are made, storage processor 100 may need to be reinitiated (i.e., rebooted), which is often an inconvenience because such computing devices (e.g., storage processor 100) are often continuously relied upon to provide access to electronic content. Further complicating the problem is that these upgrades are often made in batches that include several discrete upgrade components; wherein each upgrade component may individually require that the system be reinitiated (i.e., rebooted). And when you consider that each individual reboot procedure may take tens of minutes to complete, it is foreseeable that such an upgrade procedure may take one hour or more to complete, during which time the electronic content provided by the computing device (e.g., storage processor 100) would be unavailable and inaccessible.

Figure 3:
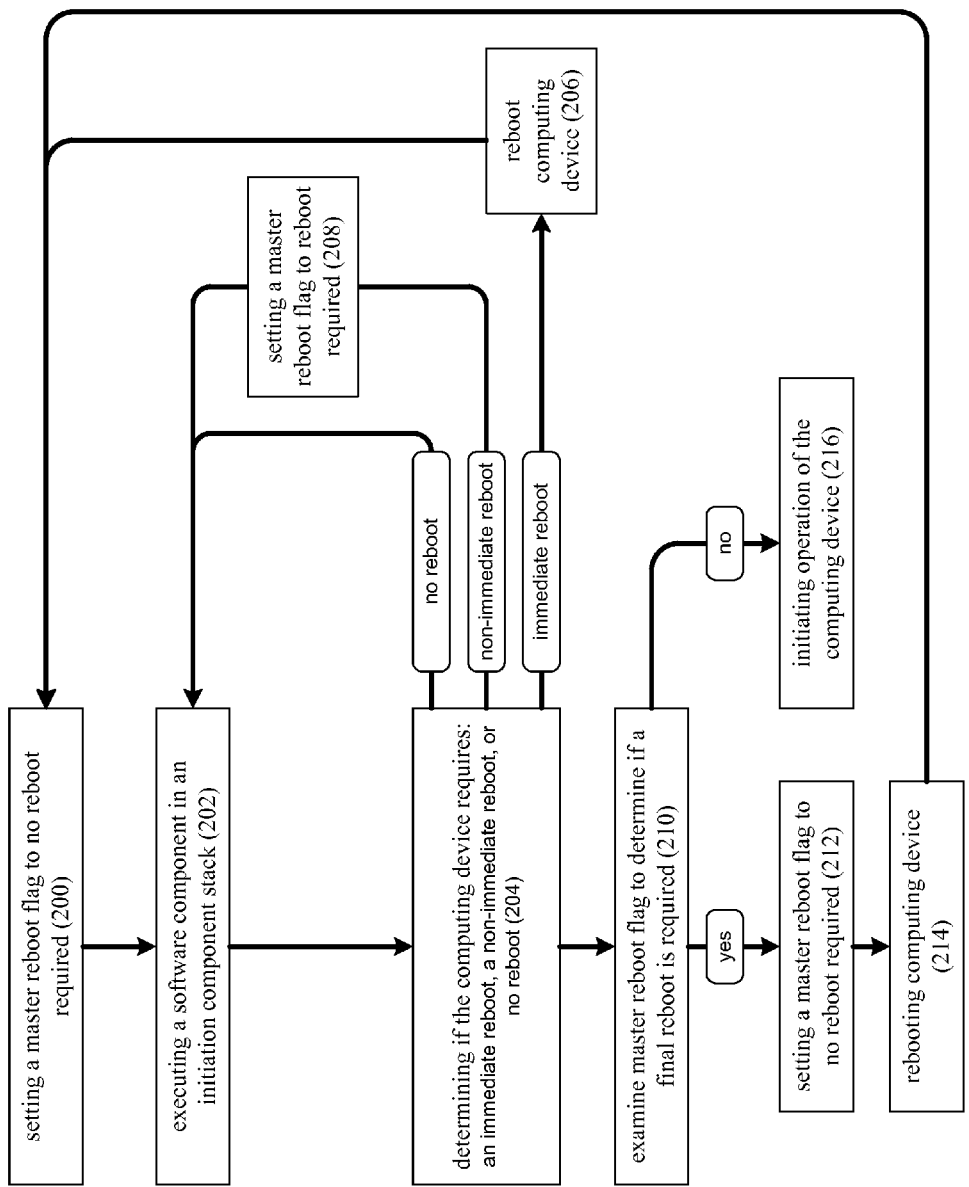
FIG. 3 is a flow chart of the storage management process of FIG. 1.

Referring also to FIG. 3, storage management process 10 may be configured to initiate (e.g., reboot) a computing device (e.g., storage process 100) in a manner that avoids/ minimizes many of the issues discussed above. Specifically and at the time that the initiation procedure is started by storage management process 10, storage manage process 10 may set 200 a master reboot flag (e.g., reboot flag 126) to no reboot required. Specifically, master reboot flag 126 may define whether or not the computing device (e.g., storage processor 100) needs to be rebooted because of one or more upgrades that were previously installed. Since the computing device (e.g., storage processor 100) is currently in the process of being rebooted, reboot flag 126 may be set to no reboot required to avoid any possibility of an endless loop of reboot cycles, wherein the rebooting of the computing device (e.g., storage processor 100) is started and, since reboot flag 126 indicates that a reboot is required, the reboot procedure is reinitiated over and over again (in an endless loop).

Assume for the following example that storage processor 100 is being upgraded with a plurality of upgrades. As discussed above, these upgrades may include firmware upgrades, software upgrades and hardware upgrades. Accordingly, an initiation component stack (e.g., initiation component stack 128) may be defined that includes a plurality of individual upgrade components that are executed in a chronological sequence. For example, initiation component stack 128 is shown to include six discrete components, namely components 130, 132, 134, 136, 138, 140).

Continuing with the above-stated example, storage management process 10 may execute 202 a software component (e.g., component 130) in initiation component stack 128. This software component (e.g., component 130) may e.g., upgrade a piece of software executed on storage processor 100, upgrade a piece of firmware included within storage processor 100, or install a driver for a piece of hardware included within storage processor 100.

Upon completing execution of this software component (e.g., component 130), storage management process 10 may determine 204 if the computing device (e.g., storage processor 100) requires: a) an immediate reboot, b) a deferred reboot, or c) no reboot. Specifically, once a software component (e.g., component 130) included within initiation component stack 128 is executed, some form of system reboot (e.g., an immediate reboot or one that is delayable) may be required. Other times, no reboot is necessary.

Sometimes this reboot procedure needs to be made immediately (e.g., prior to executing the next software component (e.g., component 132) included within initiation component stack 128). For example, when a component is executed and an upgrade is installed, sometimes a reboot is required for the upgrade to become active, wherein the upgrade needs to be active before the next component (e.g., component 132) included within initiation component stack 128 could be executed.

Accordingly, if the computing device (e.g., storage processor 100) requires an immediate reboot, storage management process 10 may:
  reboot 206 the computing device (e.g., storage processor 100);
  set 200 master reboot flag 126 to no reboot required (e.g., to avoid the endless loop scenario discussed above); and
  execute 202 the next software component (e.g., component 132) in initiation component stack 128.

Sometimes a reboot procedure is needed but does not need to be done immediately (e.g., prior to executing the next software component (e.g., component 132) included within initiation component stack 128). For example, when a component is executed and an upgrade is installed, sometimes a reboot is required for the upgrade to fully function properly. However, full functionality may not be required for the next component (e.g., component 132) included within initiation component stack 128 to be executed. Accordingly, this reboot cycle may be delayed, resulting in a decrease in downtime concerning (in this example) storage processor 100).

Accordingly, if the computing device requires a deferred reboot, storage management process 10 may:
  set 208 master reboot flag 126 to reboot required; and
  execute 202 the next software component (e.g., component 132) in initiation component stack 128.

Alternatively still, sometimes a reboot procedure is not needed at all. For example, if the software component being executed concerned something trivial (e.g., installing a new font for use when generating reports), being the report generation functionality is not currently loaded and is not currently being used, no reboot procedure may be required (i.e., neither an immediate reboot procedure or a delayed reboot procedure). Accordingly, the next component (e.g., component 132) included within initiation component stack 128 may be executed without any form of reboot.

Accordingly, if the computing device requires no reboot, storage management process 10 may:
  execute 202 the next software component (e.g., component 132) in initiation component stack 128.

Storage management process 10 may repeat the above-described processes and execute the remaining components (e.g., component 132, 134, 136, 138, 140) included within initiation component stack 128. As discussed above, after executing each of these components (e.g., component 132, 134, 136, 138, 140), storage management process 10 may determine 204 if the computing device (e.g., storage processor 100) requires: a) an immediate reboot, b) a deferred reboot, or c) no reboot.

As discussed above, if the computing device (e.g., storage processor 100) requires an immediate reboot, storage management process 10 may:
  reboot 206 the computing device (e.g., storage processor 100);
  set 200 master reboot flag 126 to no reboot required (e.g., to avoid the endless loop scenario discussed above); and
  execute 202 the next software component (e.g., component 132) in initiation component stack 128.

Further and as discussed above, if the computing device requires a deferred reboot, storage management process 10 may:
  set 208 master reboot flag 126 to reboot required; and
  execute 202 the next software component (e.g., component 132) in initiation component stack 128.

Additionally and as discussed above, if the computing device requires no reboot, storage management process 10 may:
  execute 202 the next software component (e.g., component 132) in initiation component stack 128.

Accordingly and through the above-described processes, storage management process 10 may consolidate reboot procedures and decrease downtime concerning (in this example) storage processor 100. Once the execution of the last software component (e.g., component 140) has completed, storage management process 10 may examine 210 master reboot flag 126 to determine if a final reboot is required. If master reboot flag 126 indicates that a final reboot is required, storage management process 10 may:
  set 212 master reboot flag 126 to no reboot required (e.g., to avoid the endless loop scenario discussed above);

reboot 214 the computing device (e.g., storage processor 100); and reinitiate the above-described process by setting 200 master reboot flag 126 to no reboot required.

If master reboot flag 126 indicates that a reboot is not required, storage management process 10 may:

initiate operation 216 of the computing device (e.g., storage processor 100).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method for initiating a computing device comprising:
    setting a master reboot flag to no reboot required;
    executing a first software component in an initiation component stack;
    upon completing execution of the first software component, determining if the computing device requires:
        an immediate reboot,
        a deferred reboot, or
        no reboot; and
    if the computing device requires an immediate reboot:
        rebooting the computing device,
        setting the master reboot flag to no reboot required, and
        executing a software component in the initiation component stack.

2. The computer-implemented method of claim 1 further comprising:
    if the computing device requires a deferred reboot:
        setting the master reboot flag to reboot required, and
        executing a next software component in the initiation component stack.

3. The computer-implemented method of claim 1 further comprising:
    if the computing device requires no reboot:
        executing a next software component in the initiation component stack.

4. The computer-implemented method of claim 1 further comprising:
    executing one or more additional software components in the initiation component stack; and
    upon completing execution of each of the one or more additional software components, determining if the computing device requires:
        an immediate reboot,
        a deferred reboot, or
        no reboot.

5. The computer-implemented method of claim 1 further comprising:
    if the master reboot flag is set to reboot required, setting the master reboot flag to no reboot required, and
    rebooting the computing device upon completing execution of a last software component in the initiation component stack.

6. The computer-implemented method of claim 1 wherein the computing device is being initiated due to one or more of:
    a firmware installation;
    an initial configuration/upgrade;
    a firmware upgrade;
    a software upgrade; and
    a hardware upgrade.

7. A computer program product residing on a non-transitory computer readable medium having a plurality of instructions stored thereon which, when executed by a processor, cause the processor to perform operations comprising:
    setting a master reboot flag to no reboot required;
    executing a first software component in an initiation component stack;
    upon completing execution of the first software component, determining if the computing device requires:
        an immediate reboot,
        a deferred reboot, or
        no reboot; and
    if the computing device requires a deferred reboot:
        setting the master reboot flag to reboot required, and
        executing a next software component in the initiation component stack.

8. The computer program product of claim 7 further comprising instructions for:
    if the computing device requires an immediate reboot:
        rebooting the computing device,
        setting the master reboot flag to no reboot required, and
        executing a software component in the initiation component stack.

9. The computer program product of claim 7 further comprising instructions for:
    if the computing device requires no reboot:
        executing a next software component in the initiation component stack.

10. The computer program product of claim 7 further comprising instructions for:
    executing one or more additional software components in the initiation component stack; and
    upon completing execution of each of the one or more additional software components, determining if the computing device requires:
        an immediate reboot,
        a deferred reboot, or
        no reboot.

11. The computer program product of claim 7 further comprising instructions for:
    if the master reboot flag is set to reboot required, setting the master reboot flag to no reboot required, and
    rebooting the computing device upon completing execution of a last software component in the initiation component stack.

12. The computer program product of claim 7 wherein the computing device is being initiated due to one or more of:
    a firmware installation;
    an initial configuration/upgrade;
    a firmware upgrade;
    a software upgrade; and
    a hardware upgrade.

13. A computing system including a processor and memory configured to perform operations comprising:
    setting a master reboot flag to no reboot required;
    executing a first software component in an initiation component stack;

upon completing execution of the first software component, determining if the computing device requires:
an immediate reboot,
a deferred reboot, or
no reboot; and
if the computing device requires no reboot, executing a next software component in the initiation component stack.

14. The computing system of claim 13 further configured to perform operations comprising:
if the computing device requires an immediate reboot:
rebooting the computing device,
setting the master reboot flag to no reboot required, and
executing a software component in the initiation component stack.

15. The computing system of claim 13 further configured to perform operations comprising:
if the computing device requires a deferred reboot:
setting the master reboot flag to reboot required, and
executing a next software component in the initiation component stack.

16. The computing system of claim 13 further configured to perform operations comprising:
executing one or more additional software components in the initiation component stack; and
upon completing execution of each of the one or more additional software components, determining if the computing device requires:
an immediate reboot,
a deferred reboot, or
no reboot.

17. The computing system of claim 13 further configured to perform operations comprising:
if the master reboot flag is set to reboot required, setting the master reboot flag to no reboot required, and
rebooting the computing device upon completing execution of a last software component in the initiation component stack.

18. The computing system of claim 13 wherein the computing device is being initiated due to one or more of:
a firmware installation;
an initial configuration/upgrade;
a firmware upgrade;
a software upgrade; and
a hardware upgrade.

19. A computer-implemented method for initiating a computing device comprising:
setting a master reboot flag to no reboot required;
executing a first software component in an initiation component stack;
upon completing execution of the first software component, determining if the computing device requires:
an immediate reboot,
a deferred reboot, or
no reboot;
executing one or more additional software components in the initiation component stack; and
upon completing execution of each of the one or more additional software components, determining if the computing device requires:
an immediate reboot,
a deferred reboot, or
no reboot.

20. A computer-implemented method for initiating a computing device comprising:
setting a master reboot flag to no reboot required;
executing a first software component in an initiation component stack;
upon completing execution of the first software component, determining if the computing device requires:
an immediate reboot,
a deferred reboot, or
no reboot;
if the master reboot flag is set to reboot required, setting the master reboot flag to no reboot required, and
rebooting the computing device upon completing execution of a last software component in the initiation component stack.

* * * * *